May 11, 1954 W. A. RAY 2,678,092
FUEL BURNER SAFETY CONTROL SYSTEM
Filed March 17, 1950
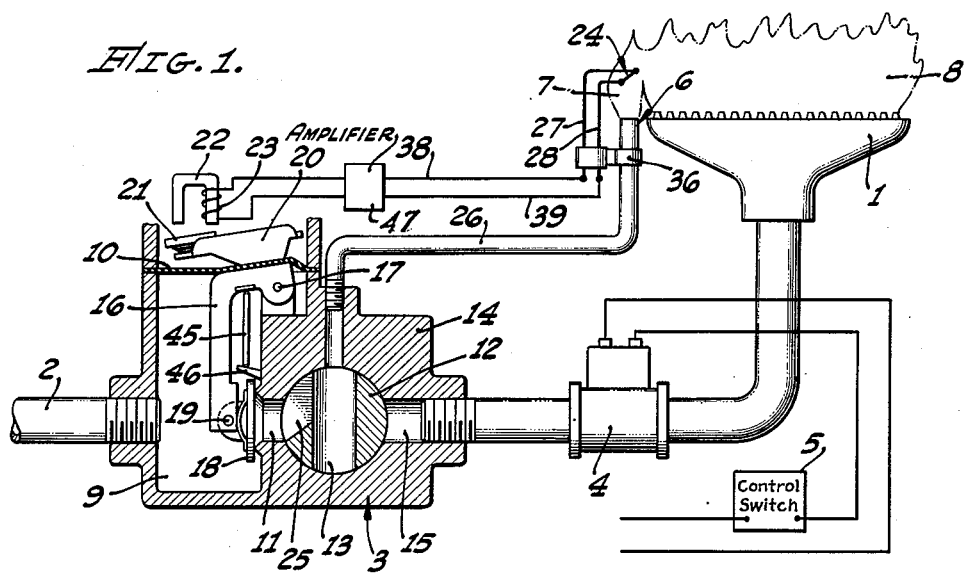
WILLIAM A. RAY, INVENTOR.
BY John Flam
ATTORNEY.

Patented May 11, 1954

2,678,092

UNITED STATES PATENT OFFICE 2,678,092

FUEL BURNER SAFETY CONTROL SYSTEM

William A. Ray, North Hollywood, Calif., assignor to General Controls Co., a corporation of California Application March 17, 1950, Serial No. 150,198

3 Claims. (Cl. 158—123)

This invention relates to a thermocouple operated safety control system for gas or oil burners. Such a system is, for example, disclosed in a prior application, filed on December 14, 1948 under Serial No. 65,113, now Patent No. 2,624,358, granted January 6, 1953, and entitled: Safety Control Fuel Valve.

This application is a continuation-in-part of an application, Serial No. 38,343, filed on July 12, 1948, in the name of William A. Ray, now Patent No. 2,535,602, granted December 26, 1950, and entitled: Thermocouple for Gas or Oil Burners.

In many forms of gas burner systems, use is made of a thermoelectric generator influenced by the heat of the pilot flame, and arranged in an electric circuit to cause interruption in the supply of fuel in the event of pilot flame failure.

Such thermocouples are formed by joining two thermoelectrically dissimilar metals, such as iron and copper, or Copel and Chromel, and subjecting the junction to a temperature higher than that at the end junctions between these thermoelectric conductors and the leads. When the "hot" junction is heated, a minute electric power is generated in a well understood manner. The temperature differential between the hot and cold junctions determines the amount of power generated; and the greater this differential, the greater the power.

This power, although minute, is utilized to maintain a definite control condition, such as to maintain a fuel valve open, for passing fuel to the burner. Upon pilot flame failure, the hot junction that had been subjected to the heat of the pilot flame cools; and, ultimately, the temperature differential is reduced to such an extent that the power generated is insufficient to maintain the control for passing fuel to the burner. There is a consequent interruption to the flow of fuel, and the system is inactive, preventing escape of unignited fuel.

In the past, it has been common to insert the hot junction directly in the flame, the cold junctions being exposed to the circumambient temperature of the furnace chamber or of the atmosphere. In such an arrangement an appreciable time must elapse before the junctions attain substantially equal temperature so as to interrupt the flow of fuel.

It is one of the objects of this invention to provide a simple and effective thermocouple system that insures a quicker response of the control system upon flame failure.

In order to accomplish this result, the thermocouple is so arranged that both the hot junction and the cold junction are inserted into the flame; and, although the flame temperature may be the same in the absence of the junctions, their presence results in a difference in temperature at the junctions sufficient to provide a controlling electromotive force. It is necessary that the temperature differential be only a few hundred degrees Fahrenheit. This difference is readily attained by proper choice and arrangement of the thermoelectric conductors. When the pilot flame fails, the hot and cold junctions reach equal temperatures, since then both junctions are subjected equally to the circumambient temperature of the furnace chamber.

The arrangement consists of three thermoelectric conductors serially joined to form two junctions, the end conductors having different capacities to conduct heat away from the flame. That junction which is joined to the conductor which conducts heat faster has a materially lower temperature than the other junction. There are several ways in which this result may be effected.

It is accordingly another object of this invention to provide a control system using thermocouple structure in which both the hot and cold junctions may be placed in a flame, and yet in which there is generation of an adequate electromotive force for control purposes.

This invention possesses many other advantages, and has other objects which may be made more clearly apparent from a consideration of several forms in which it may be embodied. Such forms are shown in the drawings accompanying and forming part of the present specification. These forms will now be described in detail, illustrating the general principles of the invention; but it is to be understood that such detailed description is not to be taken in a limiting sense, since the scope of the invention is best defined by the appended claims.

Referring to the drawings:

Figure 1 is a schematic diagram of a control system embodying the invention;

Fig. 2 is an elevation of a thermocouple structure utilized in the invention shown in use in connection with a gas pilot burner, the scale of the figure being enlarged;

Fig. 3 is a sectional view, taken along a plane corresponding to line 3—3 of Fig. 1; and Fig. 4 is a view similar to Fig. 2 of a modified form of the invention.

In the system shown in Fig. 1, a main burner 1 is shown as supplied with fuel from a conduit 2, through a safety valve structure 3, as well as through an electromagnetically operated valve 4.

The valve 4 is controlled by the aid of a control switch 5 that is included in series with the operating electromagnet of the valve 4, and which may respond to temperature variations, or the like. For example, the control switch 5 may be a thermostatically controlled apparatus.

A pilot flame burner 6 in the form of a tube is used for igniting the main burner 1 whenever the control switch 5 demands more heat. The system is shown as in inactive position. The pilot flame 7, for that reason, is shown in dot-and-dash lines, as well as the main burner flame 8.

By the aid of the safety valve structure 3, the supply of fuel to the burners 1 and 6 is interrupted in the event of pilot flame failure. This safety valve structure 3 is diagrammatically illustrated, and is similar to that described in the said prior application, Serial No. 38,343. Thus, the valve structure 3 has an inlet chamber 9 closed by a movable wall, such as a diaphragm 10. When the safety valve is open, fuel can pass to the electromagnetically operated valve 4. The safety valve structure includes a plug valve, having a manually operable plug 12 with a transverse port 13. The plug 12 is rotatably seated in the body 14 of the safety valve 3. When the plug 12 is rotated through ninety degrees in a clockwise direction, the port 13 becomes aligned with the port 11, as well as with a port 15, to permit passage of fuel to the valve 4.

A safety valve closure is operatively mounted in the chamber 9. This includes a lever 16 having a pivot pin 17. The free end of the lever carries a valve closure 18, as by the aid of a pivot pin 19. It cooperates with a raised seat around port 11.

An interlocking mechanism, similar to that shown in said prior application, Serial No. 38,343, is arranged so that counterclockwise movement of plug 12 will operate to lift the lever 16 in a clockwise direction to move the valve closure 18 away from its seat. At the same time, another lever 20, connected to lever 16, is moved to bring a disc armature 21 into attracted position with respect to an electromagnet 22. The lifting mechanism is diagrammatically illustrated by a push rod 45 and an arm 46 connected to the handle that rotates plug 12. Since this invention is not concerned with the details of the safety valve structure 3, and since said prior application, Serial No. 38,343, completely describes this structure, further description herein is not necessary.

The electromagnet 22 is energized by the aid of a coil 23 which is supplied with energy derived from a thermocouple structure 24 influenced by the heat of the pilot flame 7. If necessary, an amplifier 47 of any desired form, may be interposed between the structure 24 and coil 23. When the pilot flame 7 is in existence, the coil 23 is energized sufficiently to hold the armature 21 in attracted position, thereby maintaining the safety valve closure 18 in open position. Upon pilot flame failure, the coil 23 is de-energized, and the safety valve 3 returns to the closed position of Fig. 1, and the armature 21 drops to the released position.

Although the power generated or controlled by electromagnet 24 is sufficient to hold the armature 21 in its attracted position, it may not be sufficient to attract the armature 21 from the released position of Fig. 1. Accordingly, it is necessary to reset the armature 21 to the attracted position and to hold it there while the pilot flame 7 is re-ignited.

In order to reset the mechanism, and as described in said prior application, Serial No. 38,343, the operator of plug 12 may be rotated in a counterclockwise direction for opening the safety valve closure 18 and for bringing the armature 21 into attracted position. During this resetting period, a slot or port 25 serves to connect port 11 with the conduit 26 leading to the pilot burner 6, so that the pilot burner flame can be ignited.

After a short time, the plug 12 can be released and turned to open position in a clockwise direction.

The thermocouple structure 24 is illustrated most clearly in Figs. 2 and 3. It incorporates the end conductors 27 and 28 and an intermediate conductor 29. The intermediate conductor 29 is shown as welded, fused, or otherwise joined, to end conductors 27 and 28 to form the junctions 30 and 31. These conductors can be of 18 gauge wire of materials to be hereinafter referred to. The intermediate conductor 29 is quite short and is of the order of three-sixteenths of an inch long.

The end conductors 27 and 28 may conveniently be clamped between two insulation blocks 32 appropriately grooved to conform to the conductors 27 and 28. These insulation blocks may be clamped together by the aid of bolts 33 which pass through the end plate 34 and an extension 35 of a clamping bracket 36. This clamping bracket 36 surrounds the pilot burner tube 26 (which may be of the Bunsen type) for supporting the thermocouple structure.

Both junctions 30 and 31 are placed in the pilot flame 7 above the inner cone 37, which defines a cooler root portion of the flame. The points where these junctions 30 and 31 are located would have substantially the same temperature if the thermocouple junctions were out of the flame 7. However, due to the structure now to be described, the temperature of junction 30 is maintained substantially lower than the temperature of junction 31. In this way, a thermoelectric current is generated which may be utilized for the operation of the control system shown in Fig. 1. The end conductors 27 and 28 are joined, as by welding, to the copper conductors 38 and 39.

The end conductors 27 and 28 are made of material that is thermoelectrically different from the material of the intermediate conductor 29. Thus, for example, the end conductors 27 and 28 may be made of Copel and the intermediate conductor 29 of Chromel. Both of these materials are well known alloys suitable for thermocouple construction.

The junction 30 is maintained cooler than junction 31, since the end conductor 27 which forms the junction 30 has a greater mass within the flame 7 than the other end conductor 28 which forms the junction 31. Accordingly, there is a greater heat conduction away from the junction 30 than from junction 31. In other words, the cooling effect of conductor 27 is greater than the cooling effect of conductor 28.

Should the pilot flame 7 become extinguished, or fail, there is a very rapid equalization of temperature between the two thermocouple junctions 30 and 31. This is due to the fact that the intermediate conductor 29 is short, and transfer of heat from hot junction 31 to cold junction 30 is quite rapid. Furthermore, the performance of the thermocouple structure is entirely independent of the temperature of the circumambient atmosphere.

Although the end conductors 27 and 28 have been described as made from the same material such as Copel, it it possible to obtain the same effects when different materials are used for these end conductors. Thus, the conductor 27 may be made from thermoelectric material which has better heat conductivity than conductor 28; such, for example, as platinum or silver. This greater heat conductivity serves to lower the temperature of the junction 30 still further. In fact, under such circumstances, the length of the end conductors in the flame 7 may even be the same; and yet one junction will be maintained at a lower temperature than the other.

This form is illustrated in Fig. 4. In this form the end conductor 40 is made of a material that has relatively high heat conductivity, such as platinum or silver. The other end conductor 41 may be made of Copel, and the intermediate conductor 42 may be made of Chromel to form the cold junction 43 and the hot junction 44. As before, these junctions 43 and 44 are located in the main portion of the flame away from the inner cone 37. The better heat conducting element 40 serves to reduce the temperature of the junction 43 substantially below that of the temperature of junction 44.

In use, it has been found that temperature differentials of the order of several hundred degrees Fahrenheit can be steadily maintained between the junctions. This is sufficient to produce the required electrical energy for control purposes.

The inventor claims:

1. In apparatus of the character described: a fuel burning device adapted to produce a flame having a cone; a movable member to be controlled; an electromagnet influencing the position of said member; and a thermocouple structure influenced by the heat of said flame for controlling said electromagnet and comprising: means forming a pair of thermoelectric junctions including two end conductors and an intermediate conductor, all three conductors being serially joined, said intermediate conductor being of a material thermoelectrically dissimilar to those of the end conductors, both junctions thus formed being disposed with respect to said fuel burning device such that upon existence of a flame at said device, the junctions are located within the flame and substantially above said cone portion thereof, the lengths of the end conductors within the flame being unequal for producing a temperature difference between the said junctions large in comparison with the natural temperature gradient of the flame, and said end conductors having substantially identical cross sections.

2. In apparatus of the character described: a fuel burning device adapted to produce a flame; a movable member to be controlled; an electromagnet influencing the position of said member; and a thermocouple structure influenced by the heat of said flame for controlling said electromagnet and comprising: two end conductors and an intermediate conductor, all three being serially joined to form a pair of thermoelectric junctions, said intermediate conductor being of a material thermoelectrically dissimilar to those of the end conductors, both junctions thus formed being inserted in said flame and located at points that would have substantially the same temperature if the junctions be removed from the flame, the lengths of the end conductors within the flame being unequal and having substantially identical cross sections.

3. In apparatus of the character described: a fuel burning device adapted to produce a flame; a movable member to be controlled; an electromagnet influencing the position of said member; and a thermocouple structure influenced by the heat of the flame for controlling said electromagnet and comprising: two end conductors and an intermediate conductor, all three conductors being serially joined to form a pair of thermoelectric junctions, said end conductors being of thermoelectrically similar materials, and said intermediate conductor being of a material thermoelectrically dissimilar to that of the end conductors, both junctions thus formed being inserted in the flame and located at points in the flame that would have substantially the same temperature if the junctions be removed from the flame, the cross sections of both end conductors being substantially identical, and the lengths of the end conductors within the flame being unequal.

References Cited in the file of this patent

UNITED STATES PATENTS

| Number | Name | Date |
| --- | --- | --- |
| 1,863,373 | Harrison | June 14, 1932 |
| 2,311,785 | Sparrow | Feb. 23, 1943 |
| 2,351,277 | Mantz | June 13, 1944 |
| 2,370,326 | Ray | Feb. 27, 1945 |
| 2,384,696 | Ray | Sept. 11, 1945 |
| 2,385,530 | Paille | Sept. 25, 1945 |